United States Patent

Thorpe

[15] 3,671,667

[45] June 20, 1972

[54] SPECIAL EFFECTS GENERATORS FOR PROVIDING IRIS-TYPE TELEVISION DISPLAYS

[72] Inventor: Laurence Joseph Thorpe, Marlton, N.J.

[73] Assignee: RCA Corporation

[22] Filed: April 22, 1971

[21] Appl. No.: 136,326

[52] U.S. Cl. .......... 178/6.8, 178/DIG. 6

[51] Int. Cl. .......... H04n 5/22

[58] Field of Search .......... 178/DIG. 6, 7.1, 6.8

[56] References Cited

UNITED STATES PATENTS 3,604,849 9/1971 Skrydstrup .......... 178/DIG. 6

3,371,160 2/1968 Hurford .......... 178/DIG. 6

*Primary Examiner*—Robert L. Griffin
*Assistant Examiner*—Richard K. Eckert, Jr.
*Attorney*—Eugene M. Whitacre

[57] ABSTRACT

A special effects generator employs an electronic switch controlled by a comparator which operates to provide a series of pulses of varying durations to control the switch in a manner to produce a single video signal containing a plurality of different video signals to be displayed simultaneously in an iris display.

A feedback scheme permits the comparator to provide greater selectivity for enabling the generator to provide smaller diameter iris displays.

7 Claims, 10 Drawing Figures

INVENTOR.
LAURENCE JOSEPH THORPE
BY [signature]
ATTORNEY

INVENTOR.
LAURENCE JOSEPH THORPE
BY Arthur L. Plevy
ATTORNEY

INVENTOR.
LAURENCE JOSEPH THORPE
BY [signature]
ATTORNEY

SPECIAL EFFECTS GENERATORS FOR PROVIDING IRIS-TYPE TELEVISION DISPLAYS

This invention relates to special effects generators for studio equipment and, more particularly, to an iris-type generator.

Presently there are a number of different equipments which serve to provide different display formats in regard to the simultaneous presentation of a plurality of video scenes. The equipment used in the generation of such display formats is commonly known as special effects apparatus.

A particular type of a special effects apparatus serves to provide a first video display contained within a circle, which circle is in turn surrounded by a second video display. This particular arrangement is referred to as an iris generator because of the similarity of the display to a conventional iris arrangement.

The concept of producing an iris, as will be explained, is well known in the prior art. The difficulty with the prior art techniques is that due to the inherent operation of such generators, there is a limitation as to the diameter of the circle containing the appropriate video information. This limitation becomes visually apparent as the diameter of the circle becomes smaller. For small diameter circles the conventional circuitry cannot respond properly and hence the circle is defined by varying lines and extreme perturbations which tend to produce a very displeasing display.

According to one embodiment of the present invention, a special effects generator of the type for providing an iris display includes an electronic switch for switching from a first video signal to a second video signal upon application of a suitable control pulse thereto. A control pulse is provided by a comparator circuit which is responsive to a composite parabolic waveform consisting of a vertical parabola and a plurality of horizontal parabolas superimposed upon the crest thereof. In combination with the generator there is included apparatus for providing increased sensitivity for said comparator when iris displays of small diameter are provided. The apparatus comprises a variable gain amplifier having an input terminal adapted to receive said composite parabola and an output terminal coupled to said comparator. The gain of the amplifier is controlled by means of an integrator circuit which is responsive to the width of the pulses developed by said comparator circuit. The integrator provides a DC voltage at its output proportional to the pulse width, which voltage is used to control the gain of the amplifier and hence the amplitude of the composite parabola as applied to the comparator.

These and other embodiments of the present invention which will be described upon reference to the following specification when read in conjunction with the accompanying figures, in which.

Figure 1:
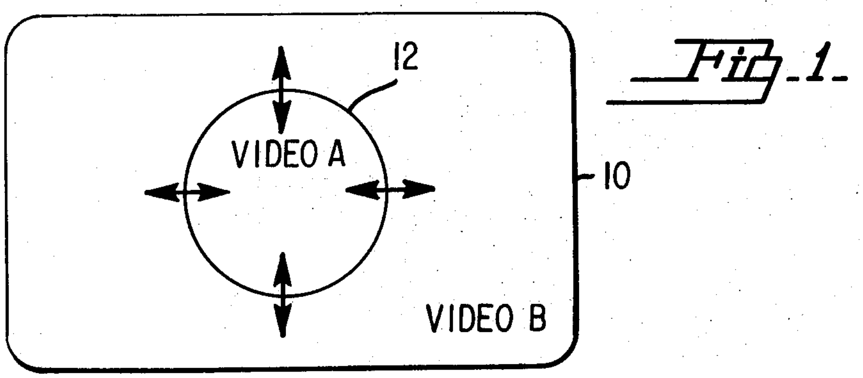
FIG. 1 is a diagram of a typical iris-type display as one would view on a video monitor.

FIG. 1 shows a typical iris television display 10. An iris display consists of a circle 12 having included therein first video information, designated as video A. The circle is superimposed within a field of second video information called video B. Such displays have also been referred to in the prior art as "circle split screeen displays". The series of arrows emanating from the circle 12 have been included to show that the diameter of the circle can be made to vary. Accordingly, larger or smaller diameter circles can be superimposed upon the video B presentation.

Figure 2:
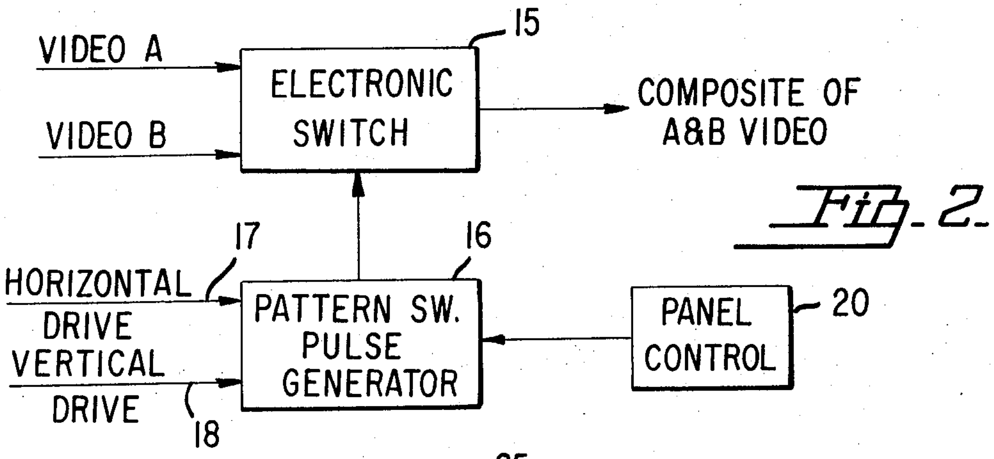
FIG. 2 is a block diagram of some basic components utilized in special effects generators.

Referring to FIG. 2, the equipment for generating such a display includes an electronic switch 15 which may, for example, be a multivibrator and suitable gate circuits. The switch 15 is under control of a pattern switch pulse generator 16. The pattern switch pulse generator 16 serves to operate the electronic switch 15 in a predetermined time sequence under control of both the horizontal and vertical drive waveshapes. The horizontal and vertical waveshapes are derived from the horizontal and vertical synchronizing signals which are common to video A and video B. Hence, two input leads 17 and 18 are shown coupled to the pulse generator 16 and are respectively designated as the horizontal and vertical drive signals. The pattern generator 16 can be controlled by means of a panel control 20 which, as will be explained, can be utilized to change or vary the diameter of the circle. Two further inputs to the electronic switch 15 are derived from two video signal sources, such as two separate cameras. The signals are respectively designated as video A and video B to thereby correlate with the display shown in FIG. 1. For example, one camera may be utilized as the video B information source to scan a sporting event, while another camera for generating the video A information may be scanning the scoreboard. Therefore, the program director, at desired intervals, may cause the special effects generator of FIG. 2 to be activated to produce a display as shown in FIG. 1. This therefore serves to superimpose the information as to the score upon the information representative of the activities. This will enable the viewer to see the score without being unduly disturbed from viewing the sporting activity. Of course, there are other examples of how such equipment can be utilized, many of which are familiar.

Before referring to FIG. 3, it is noted that conventional methods for the generation of an iris-type display function to electronically generate a circle. Mathematically, the equation for a circle can be expressed in terms of $X$ and $Y$ coordinates as follows:

$$X^2+Y^2=R^2$$

where:

$R$ = the radius of the circle and $X$ and $Y$ refer to selected orthogonal coordinates.

In the two-dimensional television system, the $X$ coordinate is the horizontal scan across the TV screen. Alternately, the $Y$ coordinate is represented by the vertical scan. Therefore, if $t_h$ is the periodic time in the horizontal direction and $t_v$ is the periodic time in the vertical direction, then the equation for the "electronic" or TV circle is:

$$K_h \times t_h^2 + K_v \times t_v^2 = R^2$$

where:

$K_h$ and $K_v$ are constants representative of amplitude.

Figure 3A:
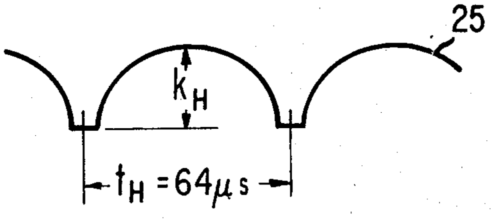
FIGS. 3A to 3F are graphs of typical waveshapes utilized for the generation of the iris display shown in FIG. 1.

The first term in the equation which is $K_h \times t_h^2$ is the equation of a horizontal parabolic waveform which is shown in FIG. 3A and defined in terms of time according to the NTSC standards. Therefore, as shown in FIG. 3A, the horizontal parabola 25 has a period equal to the time necessary to scan one horizontal line which is approximately 64 microseconds for the 525 line NTSC system.

Figure 3B:
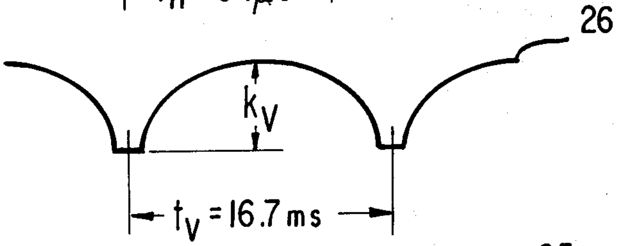

Similarly, the term $K_v \times t_v^2$ is the equation of a vertical parabolic waveform which is shown as waveform 26 of FIG. 3B. Accordingly, the period of this waveform is representative of the vertical rate which is approximately equal to 16.7 milliseconds in the NTSC system.

The first step necessary in implementing this particular special effects generator is to generate the horizontal and vertical parabolic waveforms as shown in FIGS. 3A and 3B. Techniques for generating such parabolic waveforms from typical synchronizing pulses or deflection signals are well known in the art and not considered part of this invention.

Figure 3C:
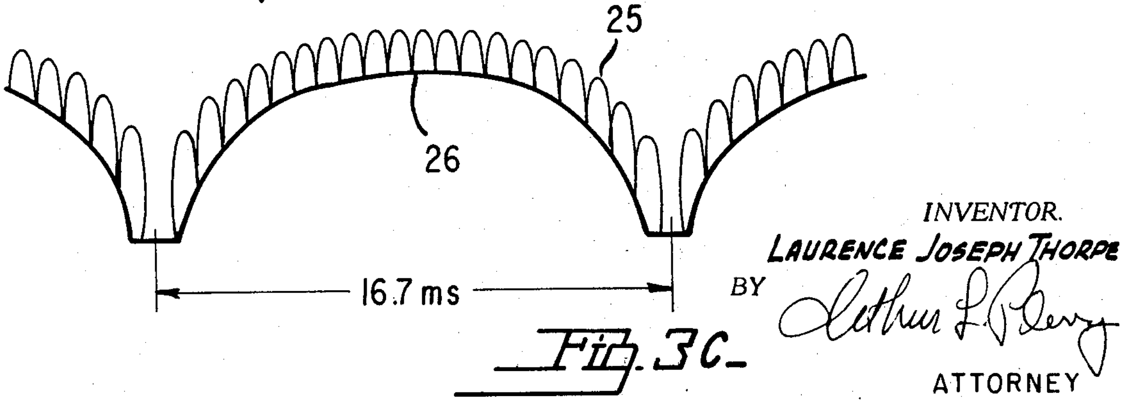

The next step necessary in generating the display is to provide a composite waveform as shown in FIG. 3C which consists of the addition of the vertical and horizontal parabolic waveforms. Essentially, the waveform shown in FIG. 3C is provided by adding the waveform of FIG. 3A to the waveform of FIG. 3B. The waveform shown is not to scale in either amplitude or time. Because of the difference in the repetition rates between the horizontal and vertical signals, there would be approximately 256 horizontal parabolas 25 superimposed on the crest of the vertical parabola 26.

The composite waveform shown in FIG. 3C is usually applied to a comparator circuit in the pattern switch pulse generator 16 which produces a pulse when the amplitude of the waveshape in FIG. 3C exceeds a predetermined value.

Figure 3D:
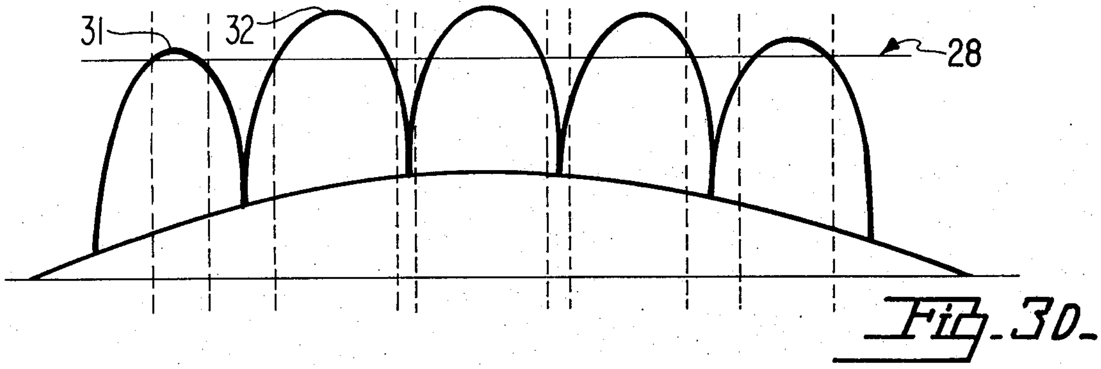

The particular operation of such a comparator circuit can best be described and explained with reference made to FIGS. 3D and 3E. FIG. 3D is an enlarged representation of a preselected portion of the composite waveshape shown in FIG. 3C.

Numeral 28 references the voltage level at which the comparator circuit will operate, which level is determined in accordance with a reference potential applied to one input of the comparator such as by the panel control 10. The other input of the comparator has applied thereto the composite waveshape shown in FIG. 3C. The comparator operates to provide at its output the signal or the waveform shown in FIG. 3E.

The operation of the circuit is as follows. When the amplitude of the composite waveshape reaches the reference level defined by line 28, the comparator is triggered from a first state shown in FIG. 3E to a second state. As long as the level of the composite waveshape exceeds the reference level, the comparator remains in the second state. As soon as the amplitude falls below or equal to the reference level, the comparator reverts back to the first state. This operation continues accordingly. A circuit which can operate to produce the pulses shown in FIG. 3E is conventionally known as a Schmitt trigger. Many examples of other suitable circuitry are well known in the art and are not considered part of this invention.

Figure 3E:
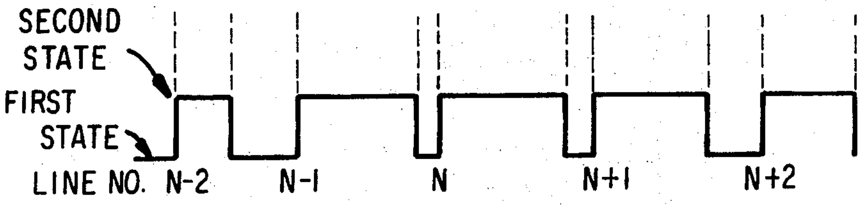
Figure 3F:
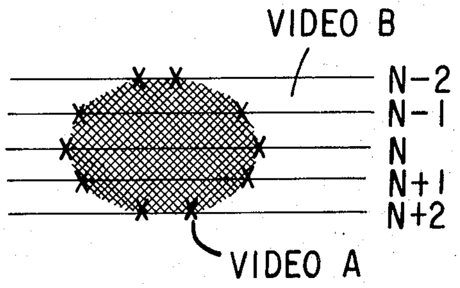

As can be seen from FIG. 3E, the output of the comparator consists of a series of pulses having constant amplitude and varying durations. The repetition rate of these pulses occur at the horizontal line rate as can be seen from FIG. 3E. For the sake of convenience, the separate pulses, each representative of a particular horizontal line, have been designated from the first to the last as N-2, N-1, N, N+1 and N+2. If these pulses were applied to the electronic switch, a television pattern would be formed as shown in FIG. 3F. For example, let us assume that the electronic switch 15 functions to pass the video A information to its output for the voltage level representative of the second state of the comparator. For the first state of the comparator, the video switch passes the video B information to the output.

During the N-2 line, as shown in FIG. 3F, video B information will be displayed until the horizontal parabola 31 superimposed upon the crest of the vertical parabola (FIG. 3D) exceeds the reference value. At this point the switch is operated to provide video A information and will do so until the amplitude of the composite signal falls below the threshold and hence the display will provide video A information during the horizontal scan of that line determined by the width of the N-2 pulse. Similarly, during the scan of the next horizontal line represented by parabola 32, the display will provide video B information until the comparator is again triggered into the second state, whereupon it again provides video A information and continues to do so for the duration of the N-1 pulse. It therefore can be seen by referring to FIG. 3F that a circular pattern can be obtained which serves to accomplish the superposition of the video A and video B information according to the format presented in FIG. 1. It can also be seen from the above description that the diameter of the circle is a function of the amplitude of the reference level impressed upon the comparator circuit and the amplitude of the vertical and horizontal parabolas. Not shown, but available, are amplitude controls to control the magnitude of both the horizontal and vertical parabolas in order to permit formation of the composite parabola and obtain circles or iris displays of various diameters.

The above description will generally acquaint one with the basic theory of iris generation and further clarify how the operation can be controlled as being partly dependent upon the DC level which is impressed upon the comparator.

In summation, referring to FIG. 2, it can therefore be seen that the pattern switch pulse generator 16 is essentially a comparator circuit which operates according to the principles described above, whereas the panel control 20 would be a control which serves to vary the DC reference level represented by line 28 of FIG. 3D.

The problems encountered in prior art iris generators are as follows.

First, when it is desired to provide an iris of small diameter (e.g., less than 20 percent of the horizontal scan), the displays become unacceptable. This is so because the comparator circuit must discriminate between horizontal parabolas which are "riding" on the crest of the vertical parabola. Since the parabola is a waveform whose rate of change is converging to zero as the peak amplitude is approached and since there are approximately 260 horizontal parabolas for one vertical parabola, the electronic discrimination becomes extremely difficult.

The system is also very sensitive to midband or low frequency noise, during such conditions, which could falsely activate the comparator.

The operation is further affected by power supply variations and so on.

All these adverse effects combine to produce jittery circles which vary randomly in size when adjusted to produce small diameter iris.

Secondly, there is a problem associated with the operational control which serves to alter the diameter of the iris. As indicated above, such a control can serve to control the amplitude of the composite parabolic signal (FIG. 3C) or to control the amplitude of the comparator reference level (FIG. 3D).

However, because the crests of the parabolas are being sampled, a small movement of either type of control can affect a considerably alteration in the diameter of the iris. This condition further adversely affects the system operation, while affording a very unsatisfactory "operational feel" to the operator.

Figure 4:
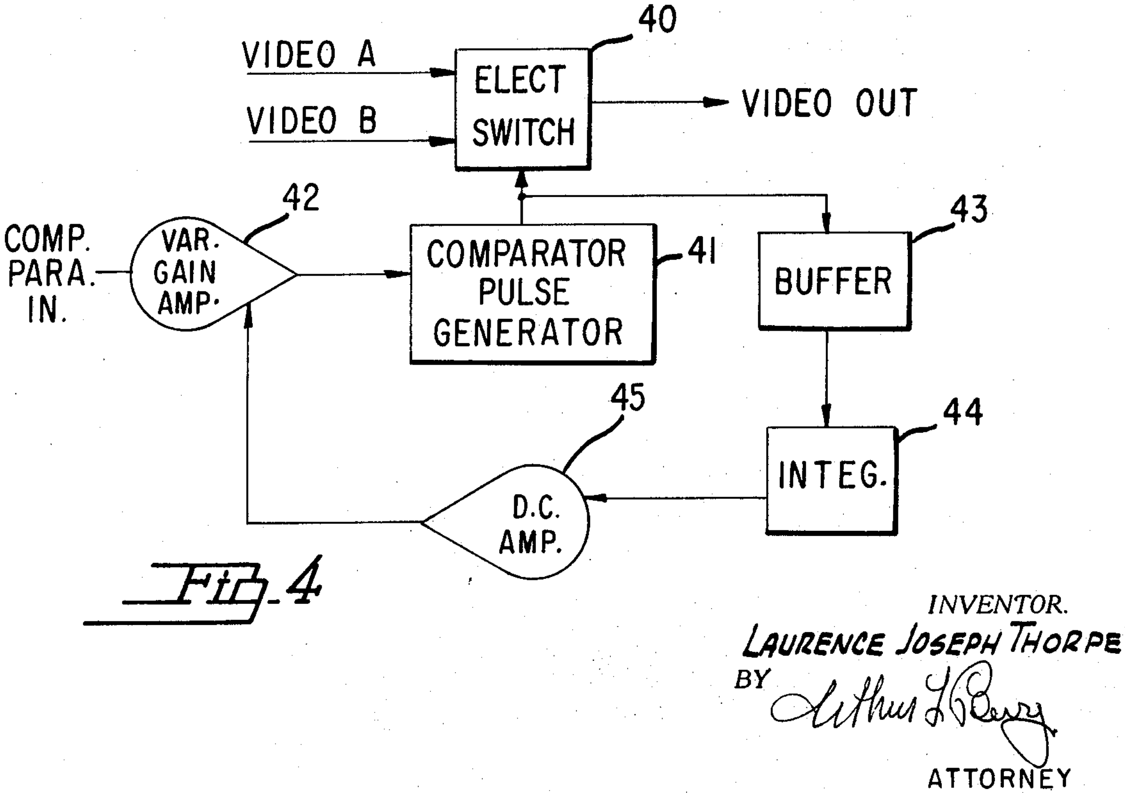
FIG. 4 is a block diagram of an improved iris generator according to this invention.

Referring to FIG. 4, there is shown an improved iris generator according to this invention.

An electronic switch 40 again functions to pass either video A or video B information to its output dependent upon the level applied to its control via the comparator circuit 41.

The comparator circuit 41 has applied to its input the composite parabola signal (FIG. 3C) via a variable gain amplifier 42. The amplifier 42 has its output terminal coupled to the input terminal of the comparator 41.

The output of the comparator 41 is conventionally coupled to the electronic switch 40 for application of the switch pulse train thereto (FIG. 3E).

The output of the comparator 41 is further coupled to the input of a buffer amplifier 43. Buffer 43 has the output thereof coupled to the input of an integrator 44, whose output is coupled to the input of a DC amplifier 45.

The output of the DC amplifier 45 is coupled to the gain control terminal of the variable gain amplifier 42.

Operation of the system is as follows.

The output pulse train from comparator 41 is applied via buffer 43 to the integrator 44. The integrator 44 provides a DC voltage proportional to the total area under the pulses which are produced. The DC control voltage is amplified via amplifier 45 and used to control the gain of amplifier 42.

The phase relationships of the system are set so that as the maximum width pulses from comparator 41 diminish (corresponding to circles of smaller diameters), the DC output of the integrator 44 decreases. The reduced DC level serves to increase the gain of the amplifier 42.

Hence, the comparator 41 receives a larger signal and can therefore discriminate more decisively. This action serves to provide an improved iris display. Since the gain is increased, this action further serves to reduce the effective rate of change of the parabola, thus further enabling proper discrimination and permitting an optimum display.

Figure 5:
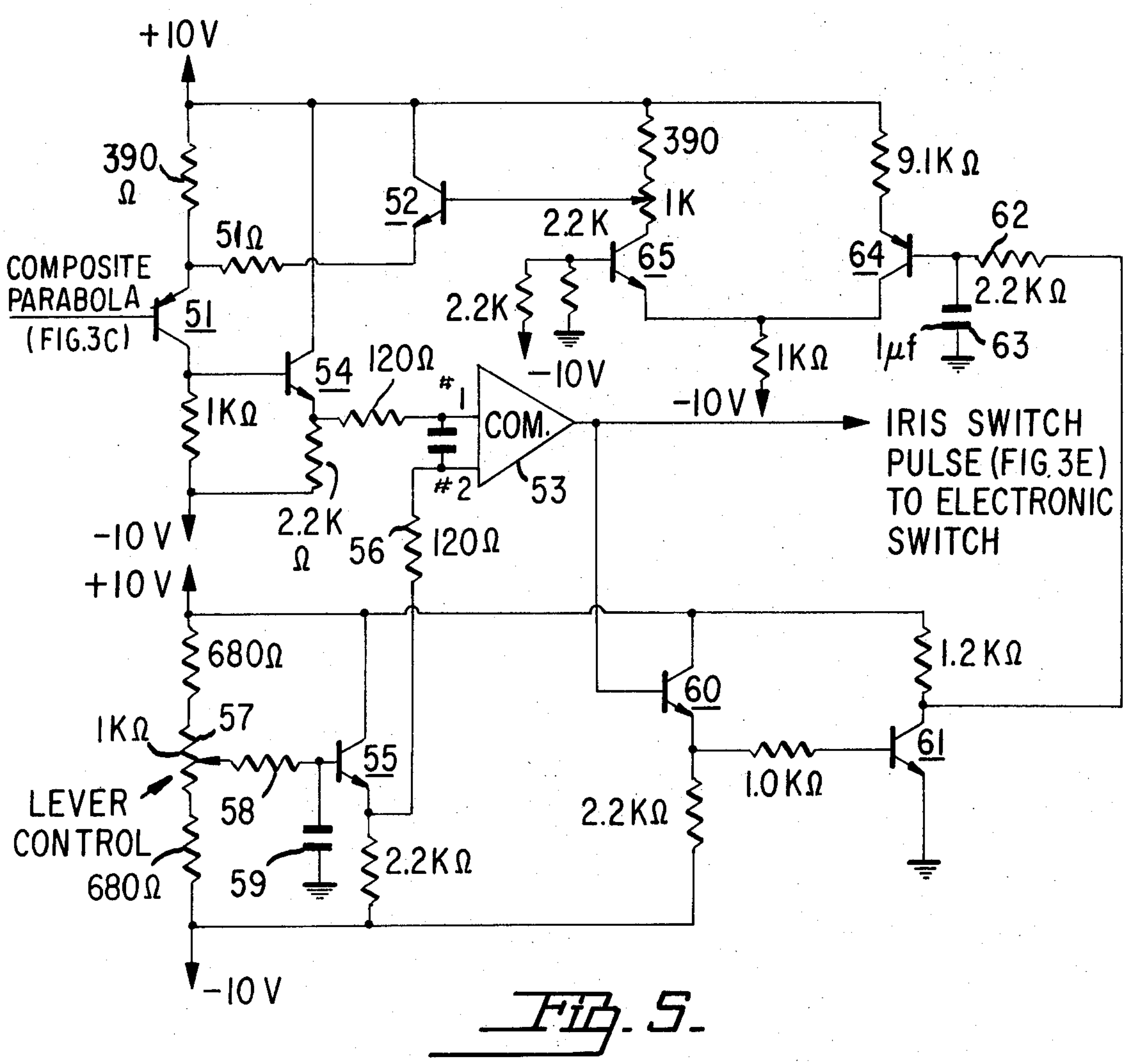
FIG. 5 is a schematic diagram showing circuit details of an iris generator according to this invention.

FIG. 5 shows the circuitry utilized in implementing the modules shown in FIG. 4.

The composite parabola (FIG. 3C) is applied to the base electrode of a common emitter amplifying stage 51. Amplifier 51 is gain controlled by means of transistor 52 which serves to control the emitter impedance and therefore the degeneration of the gain provided by amplifier 51.

As transistor 52 conducts more heavily, the emitter impedance of transistor 51 is shunted and hence the gain increases.

One input to the comparator 53 is the gain controlled composite parabola applied via the connection to the emitter electrode of emitter follower 54. The base input of emitter follower 54 is obtained from the collector electrode of transistor 51.

The reference input of the comparator 53 is obtained from the emitter electrode of the emitter follower 55, via resistor 56.

Bias for the base electrode of transistor 55 is derived from the voltage divider coupled between the +10v and −10v supplies. A variable resistor 57 included in the divider serves as the iris diameter control as it determines the reference level of the comparator (line 28 of FIG. 3D). Resistor 58 and capacitor 59 coupled between resistor 57 and the base electrode serve to stabilize the voltage at the base electrode of transistor 55.

The output pulse train from comparator 53 is applied to the base electrode of an emitter follower 60. Emitter follower 60 has the emitter electrode coupled to the base electrode of a common emitter amplifier 61.

The collector electrode of amplifier 61 drives an integrator circuit including resistor 62 and capacitor 63.

The junction between resistor 62 and capacitor 63 is coupled to the base electrode of transistor 64 forming part of a cascode type amplifier with transistor 65.

As the pulse width decreases, the voltage across capacitor 63 decreases. This causes transistor 64 to conduct harder. The potential at the collector electrode goes less negative, causing the emitter electrode of the NPN transistor 65 to be biased less negative. This causes transistor 65 to conduct less as the base is now more negative with respect the emitter. This then causes the collector voltage of transistor 65 to increase or go more positive. Thus, transistor 52 is caused to conduct harder, thus shunting the emitter of transistor 51 and raising the gain.

Therefore, the parabola as applied to the comparator 53 increases.

The above-noted action is that described and desired. Accordingly, as pulse width decreases due to small diameter iris generation, the gain of amplifier 51 is caused to increase.

The appropriate values of components have been indicated on the drawings. The transistors utilized are as follows:

| | |
|---|---|
| Transistors **51, 64** | 2N3906 |
| Transistors **52, 55, 60, 61, 65** | 2N3904 |
| Comparator **53** | UA710C integrated circuit |

The composite parabola applied to the base electrode of transistor 51 was a 6 volt peak-to-peak waveform.

WHAT IS CLAIMED IS:

1. In a special effects generator of the type for providing an iris display, said generator including an electronic switch for switching from a first video signal to a second video signal upon application of suitable control pulses thereto, provided by a control pulse generating circuit responsive to a composite parabolic waveform including the combination of a parabolic waveform at the vertical deflection rate and a parabolic waveform at the horizontal deflection rate, in combination therewith apparatus for providing increased sensitivity for said comparator when iris displays of small diameter are provided, comprising:
   a. a variable gain amplifier having an input terminal adapted to receive said composite parabolic waveform, an output terminal coupled to said control pulse generating circuit, and a gain control terminal,
   b. an integrator responsive to said control pulses to provide at an output thereof a DC control voltage proportional to the maximum width of said pulses, and
   c. means coupling said output terminal of said integrator to said gain control terminal of said variable gain amplifier.

2. The generator according to claim 1 wherein,
   said variable gain amplifier comprises a transistor, having an input base electrode, an output collector electrode, and an emitter control terminal.

3. The generator according to claim 2 further comprising,
   a. a second transistor arranged in an emitter follower configuration, having a base input electrode coupled to said integrator, and an emitter electrode coupled to said emitter electrode of said first transistor for shunting said electrode and thereby controlling the gain thereof in accordance with the magnitude of said DC control signal.

4. The apparatus according to claim 1 further comprising,
   a. a DC amplifier having an input terminal coupled to said integrator and responsive to said dc control signal to provide at an output terminal an amplified DC control signal, and
   b. means coupling said output terminal of said DC amplifier to said control terminal of said variable gain amplifier.

5. The apparatus according to claim 1 wherein said integrator includes a resistor and a capacitor.

6. A special effects generator for providing signals necessary to generate a circular type television display comprising in combination,
   a. an electronic switch having first and second inputs, each adapted to receive a different video signal, a control terminal for causing said signal at said first input to appear at an output terminal of said switch for a first voltage level applied thereto, and to cause said signal at said second input to appear at said output terminal for a second voltage level applied to said control terminal,
   b. a comparator circuit having a first input terminal adapted for application thereto of a composite parabolic waveform representative of said circular display, and a second terminal adapted to receive a reference level, said comparator operative to provide said first voltage level at an output terminal when the magnitude of said composite parabolic waveform exceeds said reference level, and to provide said second voltage level when the magnitude is lower than said reference level, said output terminal coupled to said control terminal of said switch,
   c. an integrator circuit having an input coupled to said output terminal of said comparator for providing a DC voltage according to the durations of the transitions of said comparator between said first and second levels,
   d. a variable gain amplifier having an input terminal adapted for application thereto of said composite parabolic waveform, and an output terminal coupled to said first input terminal of said comparator, said amplifier further having a gain control terminal coupled to said output terminal of said integrator to vary the gain of said amplifier according to the magnitude of said DC voltage.

7. The generator according to claim 6 wherein the gain of said variable gain amplifier increases as the DC voltage from said integrator decreases.

* * * * *